April 6, 1926. 1,579,472
A. CROST
REENFORCING MEANS FOR SPINDLE BOLTS
Filed Sept. 24, 1925 2 Sheets-Sheet 1

Inventor
Albert Crost
By Hull, Brock & West
Attys.

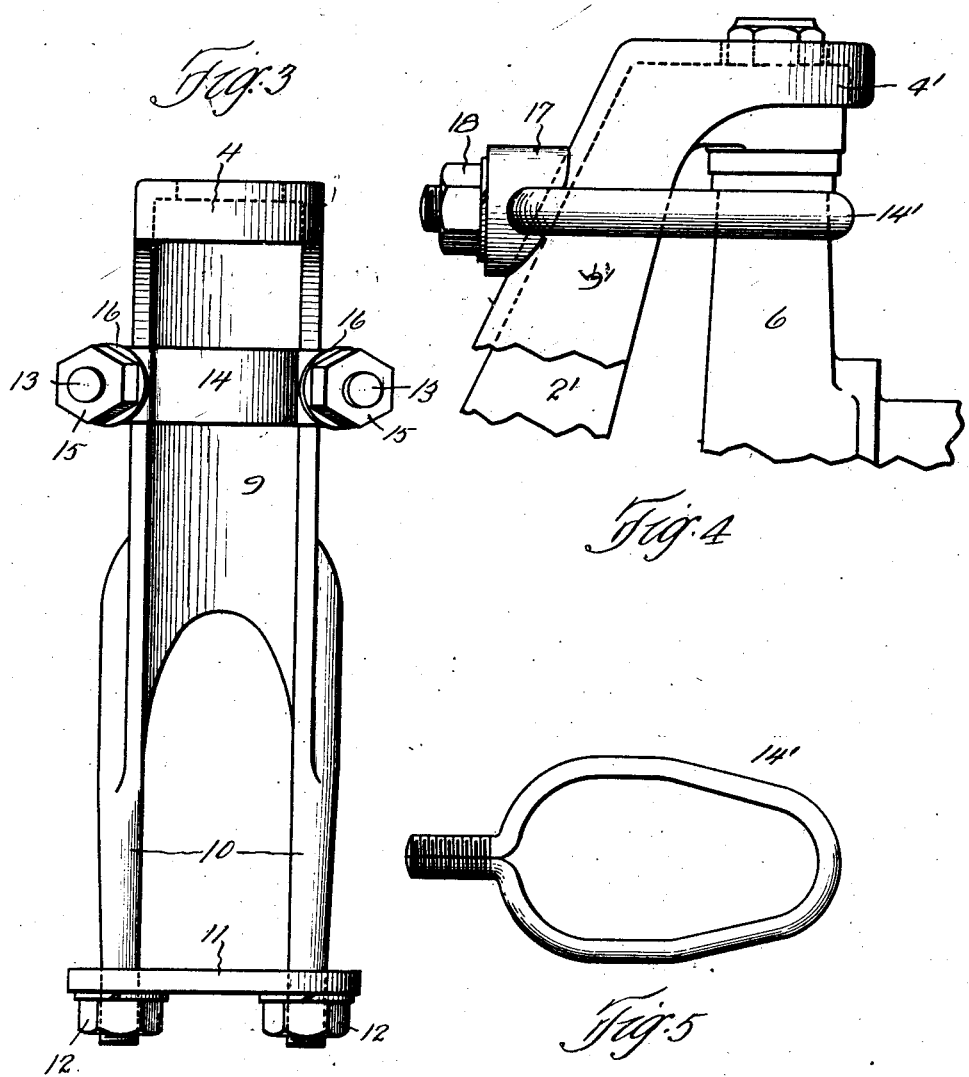

Patented Apr. 6, 1926.

1,579,472

UNITED STATES PATENT OFFICE.

ALBERT CROST, OF CLEVELAND, OHIO.

REENFORCING MEANS FOR SPINDLE BOLTS.

Application filed September 24, 1925. Serial No. 58,259.

*To all whom it may concern:*

Be it known that I, ALBERT CROST, a citizen of the United States, residing at Cleveland, in the county of Cuyahoga and State of Ohio, have invented a certain new and useful Improvement in Reenforcing Means for Spindle Bolts, of which the following is a full, clear, and exact description, reference being had to the accompanying drawings.

This invention relates to an improved reenforcement or brace for strengthening and retaining the spindle bolt of a vehicle of the automobile type.

The object of the invention is to provide a means for taking up the lost motion between the spindle and the bearing therefor, and to stop rattles and vibrations of the front of the car and to prevent the front wheels from shimmying.

Further objects of my invention are to stop the back lash in the steering wheel when traveling over rough roads, to keep the front wheels in proper alignment, to give better steering control, to stop rattle of the steering rods, to stop wobble of the steering wheel and to make the car safer to drive.

The objects of the invention are accomplished chiefly by reenforcing the spindle bolt and the forks of the axle whereby the same may be better able to resist and withstand the various shocks and strains on the forks incident to the swinging movement of the spindle and the vibration of the wheels when riding over rough road beds. Therefore, I attain the objects of the invention by providing reenforcing and bracing means which will offset and resist the various strains referred to and thereby reduce wear and vibration and prolong the life of the car.

The invention comprises further features and combinations and arrangements of parts as will be hereinafter more fully described and set forth in the appended claims.

Figure 1:
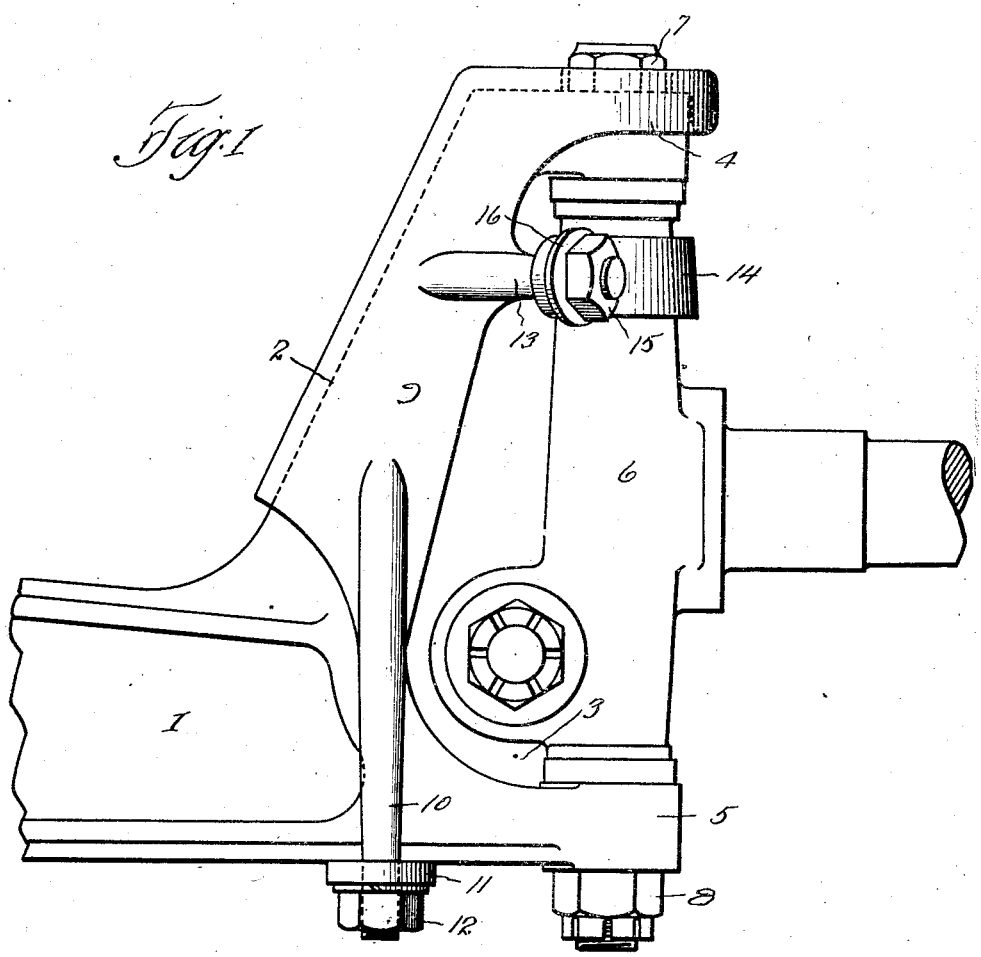
Figure 2:
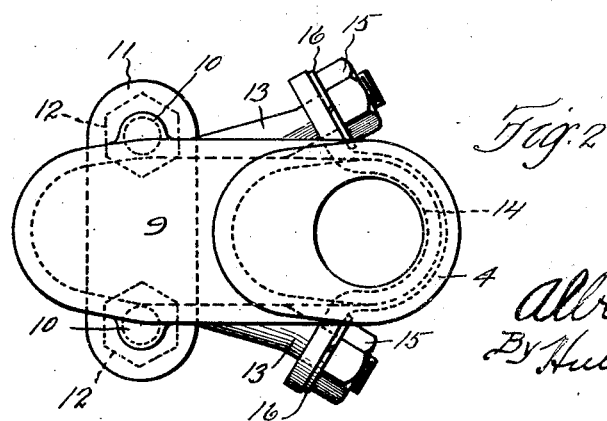

In the drawing Fig. 1 is a view in side elevation of a device constructed in accordance with my invention; Fig. 2 is a top plan view of the same; Fig. 3 is a front elevation of the brace; Fig. 4 is a side elevation of a modified form of brace; and Fig. 5 is a detail view of the split clevis or clamping ring used with the form of the invention disclosed in Fig. 4.

Referring more particularly to the accompanying drawings 1 designates a portion of a conventional form of axle provided with the usual forks 2 and 3. The fork 2 inclines upwardly and has an overhanging horizontal portion 4 which is spaced in superimposed parallel relation to the lower horizontal portion 5 of the fork 3. These portions have suitable aligned openings therein adapted to receive therethrough respectively the upper and lower ends of the spindle bolt 6 and to form a bearing for the same. Nuts 7 and 8 serve to hold the spindle bolt in place.

Secured to the upper fork of the axle and extending up and around the horizontal portion 4 is a brace or reenforcing member 9. This member 9 may be cast or stamped and is formed to closely fit the axle and upper fork, the upper part of the same extending upwardly and around the horizontal portion 4 of the fork as clearly shown in Fig. 1. This upper portion has an opening therethrough in alignment with the opening in the horizontal portion 4 of the fork. It will be noted that the spindle bolt passes through this opening and that the nut 7 is above the brace 9 the purpose of which will hereinafter appear. The lower end of the brace 9 has a pair of arms 10 formed integral therewith and these arms are adapted to pass downwardly along each side of the axle as disclosed in Fig. 1. These arms are screw threaded at their lower ends the purpose of which will hereinafter appear.

To secure the brace to the axle the nut 7 is removed and the brace 9 is placed over the fork 2 with the upper part engaging around the horizontal portion 4, the upper end of the spindle bolt passing through the opening in the brace. The arms 10 pass down around or straddle the axle. For securing the brace to the axle I provide a clamp 11 having suitable openings 11' therein adapted to receive the arms 10 therethrough. The clamp 11 is placed over the arms 10 and suitable nuts 12 are then applied and tightened to rigidly secure the brace to the axle. The nut 7 is then replaced and tightened.

Formed integral with the brace 9 is a pair of oppositely disposed arms as clearly shown in Figs. 1 and 2. These arms are threaded at their outer ends the purpose of which will hereinafter appear. A clamping ring 14 formed as shown in Fig. 2 surrounds the spindle bolt 6 and is secured to the arms 13 by means of suitable nuts and washers 15 and 16. The nuts 16 may be tightened as desired to take up any lost motion of the spindle bolt. The clamping ring also serves as an emergency means for preventing dismounting of the spindle in event of displacement or breakage of the bolt. When used with Ford cars this clevis also serves to keep the car in the road and to prevent wobbling of the front wheels.

In Figs. 4 and 5 I have shown a modified form of my device in which I use a detachable split ring or clevis 14' as a substitute for the clamping ring 14. The ring 14' is formed as clearly shown in Fig. 5 and is adapted to surround the brace and spindle bolt as shown in Fig. 4. A washer 17 of suitable material having the same inclination as the brace is first inserted over the end of the clevis and a nut 18 is then applied and tightened as desired. The brace 9 preferably has an embossed portion or groove which serves to hold the clevis in a horizontal position. This clevis performs the same function as the clamping ring 14.

It will now be clear that I have provided a device which will accomplish the objects of the invention as hereinbefore stated.

Having thus described my invention, what I claim is:

1. In combination with a forked axle having a wheel engaging spindle mounted thereon, a reenforcing brace secured to said axle, and extending along one fork of said axle, an adjustable clevis surrounding said spindle and brace comprising means for drawing said spindle toward said brace.

2. In combination with a swivel joint including axle forks and a spindle bolt mounted therebetween, a reenforcing brace secured to and overlying one of said forks, and adjustable means connecting said brace and spindle whereby to exert a lateral pull on said spindle.

3. In combination with a forked axle having a spindle bolt mounted between the forks thereof, an adjustable brace secured to said axle and overlying the upper fork thereof and surrounding said spindle bolt, a clevis surrounding said spindle bolt and adjustably secured to said brace whereby to reenforce said spindle bolt and to draw the same toward said brace.

4. In combination with a forked axle having a spindle bolt mounted between the forks thereof, a reenforcing brace secured to said axle and extending along the upper fork thereof and having an opening therein adapted to receive said spindle bolt therethrough, and an adjustable clevis surrounding said spindle bolt and brace.

5. In combination, a forked axle having a spindle bolt mounted between the forks thereof, an adjustable brace secured to said axle and having a portion surrounding said spindle bolt at a point spaced from the ends thereof and means for adjusting said brace whereby to reenforce said spindle bolt and to exert a lateral pull thereon.

In testimony whereof, I hereunto affix my signature.

ALBERT CROST.